US005142129A

United States Patent [19]

[11] Patent Number: 5,142,129

Nakamura et al.

[45] Date of Patent: Aug. 25, 1992

[54] PASSBOOK TRANSPORT MECHANISM

[75] Inventors: Yasushi Nakamura, Kanagawa; Junnosuke Takeda, Ebina, both of Japan

[73] Assignee: NCR Corporation, Dayton, Ohio

[21] Appl. No.: 432,435

[22] Filed: Nov. 6, 1989

[30] Foreign Application Priority Data

Apr. 28, 1989 [JP] Japan ................................ 1-107926

[51] Int. Cl.[5] .......................... G06F 15/30; B41J 3/28

[52] U.S. Cl. .................................... 235/379; 235/432; 235/462; 271/274; 271/42; 400/24; 400/636

[58] Field of Search ............... 235/379, 432, 462, 379; 400/613.3, 613.4, 617, 618, 619, 583.3, 607, 708, 24, 636; 271/274, 42

[56] References Cited

U.S. PATENT DOCUMENTS 2,569,387 9/1951 Robinson .............................. 271/42
2,827,288 3/1958 Geisler .............................. 271/42 X
3,269,590 8/1966 Harter .............................. 271/42 X
3,645,527 2/1972 Gates .................................... 271/42
3,770,093 11/1973 De Hart et al. .
3,803,388 4/1974 Williamson et al. ......... 400/583.3 X
3,933,234 1/1976 Smith et al. .
3,951,251 4/1976 Zaccagnino, Jr. .
4,032,132 6/1977 Mignano .......................... 271/42 X
4,279,413 7/1981 Siwik et al. ......................... 271/274
4,555,104 11/1985 Fukuju et al. .
4,600,828 7/1986 Nogami et al. .
4,699,374 10/1987 Hain .
4,743,129 5/1988 Keryhuel et al. .
4,944,616 7/1990 Watanabe et al. ............. 400/708 X

*Primary Examiner*—David Trafton
*Attorney, Agent, or Firm*—George J. Muckenthaler

[57] ABSTRACT

A passbook transporting or conveying mechanism has front gripping rollers for gripping the passbook in unprinted areas thereof and for moving the passbook to a printing station. The front gripping rollers are caused to be moved along guide rods in a rearward direction by driving wires or cables connected to roller supports. The passbook is received by rear gripping rollers which are caused to be moved along guide rods in a further rearward direction by driving wires or cables connected to roller supports to a predetermined position for reading a magnetic stripe on the back cover of the passbook. The magnetic stripe on the passbook is read out and the passbook is moved forward to position the passbook at the printing station for the printing operations on the desired print line or lines. After the printing operations, the passbook is again moved rearward to record the printed information in the magnetic stripe. The passbook is then moved in a forward direction to the front gripping rollers for exit from the printer.

16 Claims, 4 Drawing Sheets

PASSBOOK TRANSPORT MECHANISM

CROSS REFERENCE TO RELATED APPLICATIONS

Passbook Page Turning Mechanism, U.S. Pat. No. 4,995,184, issued Feb. 26, 1991, invented by Ken Ebato and Susuma Sato and assigned to NCR Corporation.

Passbook Read/Write Mechanism, U.S. Pat. No. 4,944,616, issued Jul. 31, 1990, invented by Shingo Watanabe and Shohei Murakami and assigned to NCR Corporation.

BACKGROUND OF THE INVENTION

In the field of financial-type business transactions, a commonly used record medium is a passbook or bankbook for maintaining a record of each transaction. The passbook is inserted into a business machine for reading the contents of the passbook, for printing information or data in the passbook, and for recording the printed information or data in the passbook.

In the operation of the business machine for passbook printing therein, the passbook is inserted at the front of the machine and the passbook is then transported or conveyed past a printing station toward the rear of the machine where the current status of the record is read by means of read/write mechanism from a magnetic strip on the passbook. The passbook is then transported to the printing station for printing operation after which the passbook is again transported toward the rear of the machine where the printed information is recorded by means of the read/write mechanism in a write operation on the magnetic stripe. The passbook is then transported toward the front and out of the business machine.

In prior mechanisms there have generally been two types of means for conveying a printed medium such as a bankbook to predetermined positions in a printer to enable the required operations. One type of conveying means uses pairs of rollers spaced from each other and disposed at spaced intervals along the path of the bankbook and rotatably engaged with the book. Another type of conveying means uses rotating rollers provided on both sides of a feed path and belts driven by the rotating rollers and engageable with the book.

Representative documentation in the area of passbook transport mechanisms includes U.S. Pat. No. 3,933,234, issued to J. L. Smith et al. on Jan. 20, 1976, which discloses a document handling assembly for a printer.

U. S. Pat. No. 3,951,251, issued to N. V. Zaccagnino on Apr. 20, 1976, discloses document positioning means for printing apparatus.

U.S. Pat. No. 4,555,104, issued to O. Fukuju et al. on Nov. 26, 1985, discloses an overlapping document feed apparatus.

U. S. Pat. No. 4,600,828, issued to M. Nogami et al. on Jul. 15, 1986, discloses a system for issuing passbooks that includes means for feeding a passbook along a guide chute.

U. S. Pat. No. 4,743,129, issued to A. Keryhuel et al. on May 10, 1988, discloses a passbook printer having a conveyor belt.

SUMMARY OF THE INVENTION

The present invention relates to mechanism for conveying a record medium such as a passbook to predetermined positions in a passbook printer for recording financial transactions.

In accordance with the present invention, there is provided a record medium transport mechanism in a printer or like business machine comprising first opposed rollers for gripping the record medium at specific areas thereof, the first opposed rollers being movable along a feed path in the printer from a first predetermined position to a second predetermined position wherein second opposed rollers grip the record medium, the second opposed rollers being movable along a feed path in the printer to a third predetermined position for read/write operations regarding the record medium, the second opposed rollers being movable to transport the record medium to a printing position for printing operation, and said first opposed rollers again gripping said record medium for transporting thereof from the printer.

In accordance with the above discussion, a principal object of the present invention is to provide means for positively transporting a record medium to predetermined positions in a printer or like business machine.

Another object of the present invention is to provide means for gripping a record medium and for transporting thereof from one to another position in a business machine.

An additional object of the present invention is to provide means for gripping a record medium and for transporting thereof along a straight path in a printer.

A further object of the present invention is to provide first means for gripping a record medium and for transporting thereof from one position to another position and second means for gripping the record medium at said another position and for transporting thereof to a further position in a printer.

Additional advantages and features of the present invention will become apparent and fully understood from a reading of the following description taken together with the annexed drawing.

DESCRIPTION OF THE PREFERRED EMBODIMENT

Figure 1:
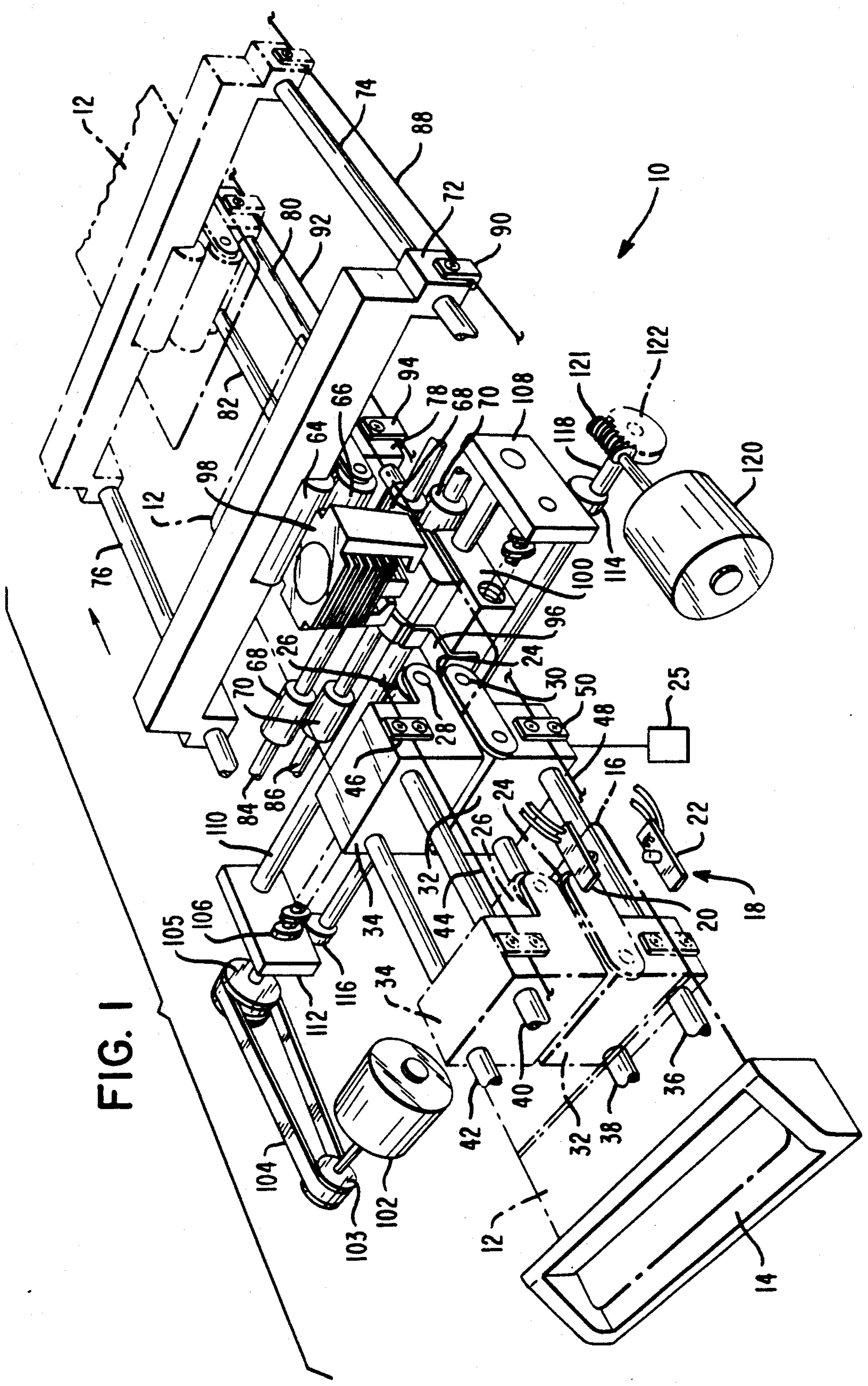
FIG. 1 is a perspective view of the record media transport mechanism incorporating the structure of the present invention.

FIG. 1 is a perspective view of a portion of printing mechanism, generally designated as 10, for printing on a record medium such as a passbook 12. The printing mechanism or printer 10 has an insert or entrance port 14 at one end thereof for receiving the passbook 12 for processing a printing or recording operation. The insert port 14 is located at the front of the printer 10. A shutter or like member (not shown) is provided at a predetermined distance from the insert port 14. The shutter is in a normally closed position in the printer 10 and is engaged by an end 16 of the passbook 12 when the passbook is inserted into the receiving end or insert port 14 of the printer 10. A sensor 18 having an upper portion 20 and a lower portion 22 is supported in a position to detect the insertion of the passbook 12. The sensor 18 may comprise a limit switch, a photosensor or like element supported and connected in suitable manner to detect the presence of the passbook 12.

When the passbook 12 is detected by the sensor 18, a printer controller (not shown) causes a lower roller 24 to be moved toward an upper roller 26 by means of a solenoid 25 or other actuating device. The passbook 12 is in position to be gripped by the upper roller 26 and the lower roller 24, designated as front grip rollers, in marginal areas of the passbook which are not used in the printing and/or recording operations. The rollers 24 and 26 are coated with a material having high frictional characteristics such as rubber or the like so as to firmly grip and thus maintain the passbook 12 in precise position between the rollers 24 and 26. The upper roller 26 is designed to perform as a drive roller by means of being supported on a rotatable shaft 28 in order to be conveyed or transported toward the rear of the printer 10. The lower roller 24 performs as an idler roller and freely rotates on a shaft 30. Frictional contact of the two rollers and driving the upper drive roller 26 causes the lower roller 24 to be rotated by the upper roller. The correct amount of rotational loading on the lower roller 24 is maintained so as to prevent the passbook 12 from moving down and away from the upper roller 26 during transport of the passbook 12. After the passbook 12 has been gripped by the rollers 24 and 26, the controller opens the shutter to allow the passbook 12 to be transported toward the rear of the printer 10.

The rollers 24 and 26 are supported by brackets 32 and 34 which in turn are carried on lower rods or shafts 36, 38 and on upper rods or shafts 40, 42, respectively. The rollers 24 and 26 are moved in parallel manner along a feed path for the passbook 12 while such rollers are gripping the passbook. A driving wire or cable 44 is secured by means of a clip 46 to the upper bracket 34 and a driving wire or cable 48 is secured by means of a clip 50 to the lower bracket 32 for moving the brackets 32, 34 and the rollers 24, 26 along the passbook feed path. The driving wires or cables 44 and 48 are connected to appropriate drive means (not shown) for moving the rollers 24 and 26 along the feed path for transporting the passbook toward and from the printing station. This structure provides an arrangement wherein the upper roller 26 and the lower roller 24 move parallel with each other along the feed path of the passbook 12 while maintaining their relative positions.

Figure 2A:
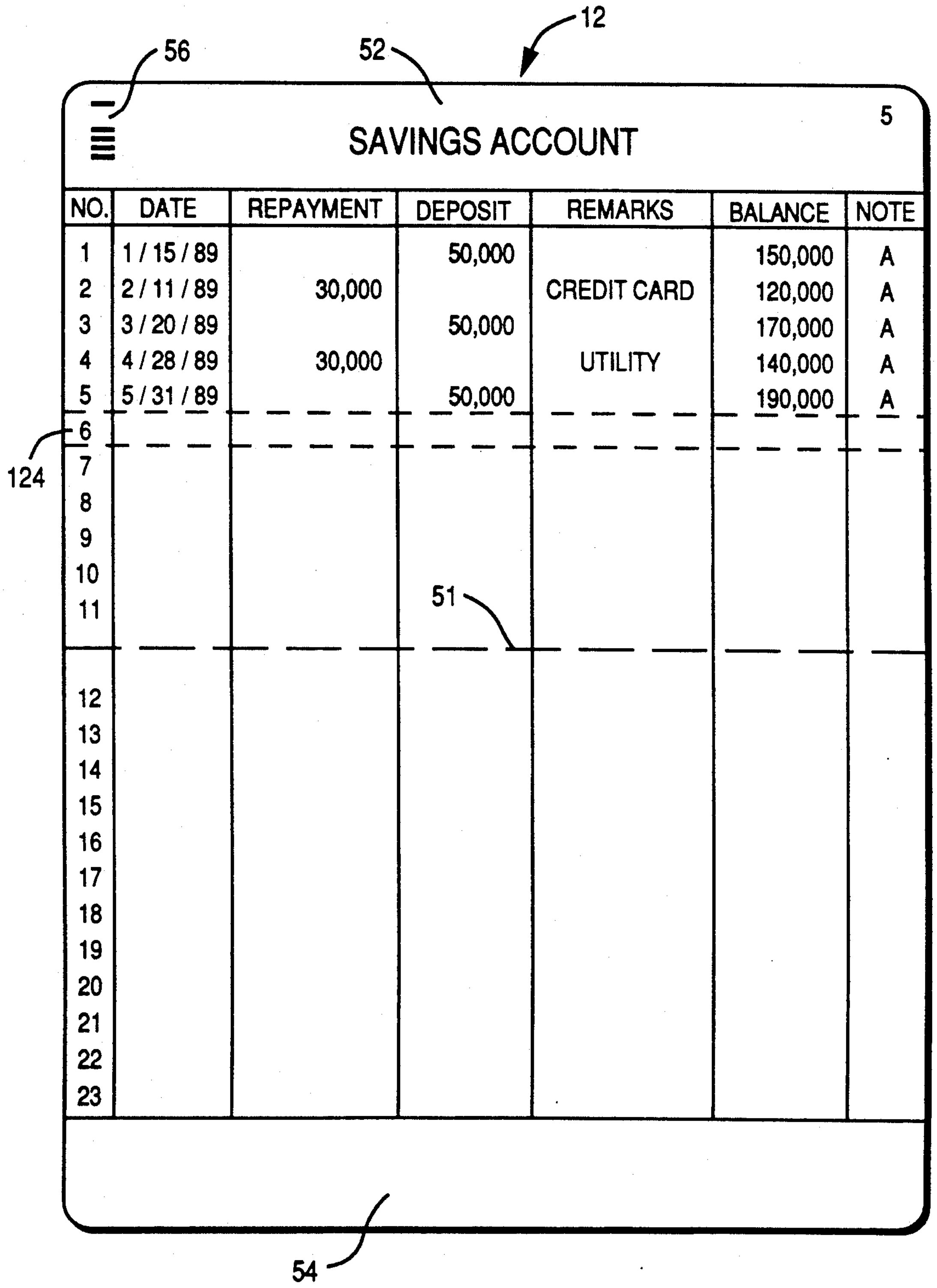
FIGS. 2A and 2B show a printing area of the record medium or passbook and the front and back covers of the passbook.
Figure 2B:
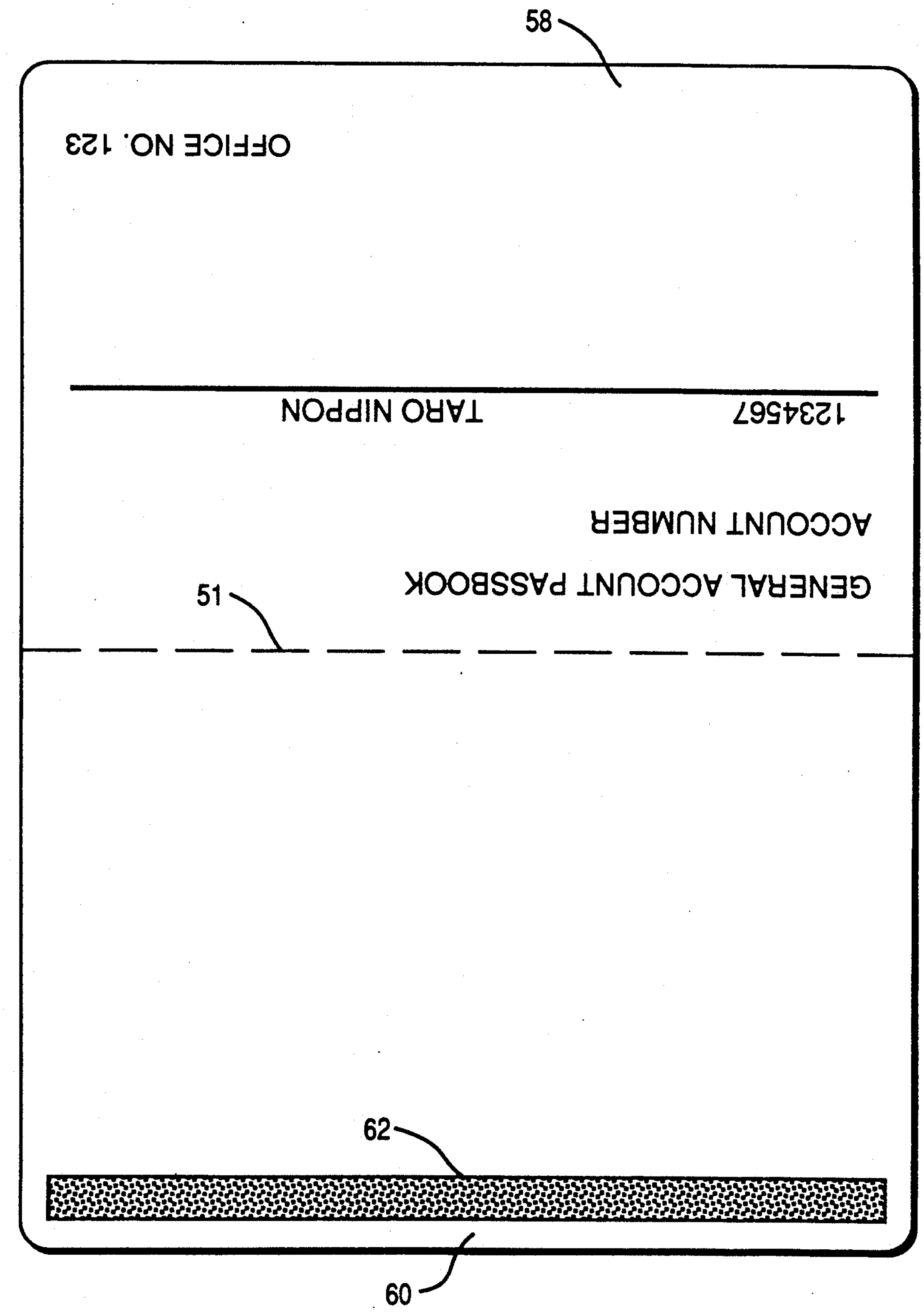

FIG. 2A is a view of the passbook 12 in open condition at the fold line 51 and FIG. 2B is a view of the front and back covers of the passbook 12 in a turned over condition from that of FIG. 2A. The passbook 12 is inserted into the port 14 at the front of the printer 10 in the open condition, as shown in FIG. 2A. An upper portion 52 of the passbook 12 is shown as having printed matter in five lines out of eleven lines thereof and a lower portion 54 is shown as having twelve blank lines. The upper portion 52 includes appropriate headings such as the date, repayment, deposit, balance and the like which are common terms used in financial transactions.

A bar code or like marking 56 is provided at the upper left corner of the upper portion 52 of the passbook 12 and such bar code 56 indicates the number of the page of the passbook 12. The front cover 58 (FIG. 2B) of the passbook 12 includes appropriate information regarding the identification of the holder of the passbook 12. A magnetic stripe 62 is provided at the lower edge of the back cover 60. The magnetic stripe 62 contains information or data such as an identification code, information or data regarding previous transactions and like information. The page number of the passbook 12, as indicated by the bar code 56, is read out when the passbook is inserted into the port 14 of the printer 10 and when the passbook 12 is disposed at a predetermined position in preparation for a transaction.

An upper roller 64 and a lower roller 66 (FIG. 1), designated as rear grip rollers, are provided at the rear of the printer 10. The lower roller 66 is coated with a material having high frictional characteristics such as rubber or the like so as to firmly grip the passbook 12. The upper roller 64 is covered over approximately one-half the periphery thereof with rubber and the other one-half is not covered and is exposed metal.

The upper rear grip roller 64 is supported by a bridge member 72 which is carried on outer rods 74 and 76. Additional supporting structure 78 for the lower rear grip roller 66 is carried on rods 80 and 82 located between the outer rods 74 and 76. A pair of opposed rollers, an upper roller 68 and a lower roller 70, are positioned in an area between the front grip rollers 24 and 26 and the rear grip rollers 64 and 66. The opposed rollers 68 and 70 are carried on transverse rods or shafts 84 and 86. As shown in FIG. 1, a right upper roller 68 and a right lower roller 70 are carried on the shafts 84 and 86 and are spaced from the rollers 68, 70 at the left side of the shafts.

The drive roller 26 of the front grip rollers is positively rotated to feed or transport the passbook 12 to the opposed rollers 68 and 70. Since the lower roller 24 is an idler roller, such roller is free to rotate during movement of the passbook 12 toward the rear of the printer 10. It is also noted that the passbook 12 is transported in the rearward direction by the driving force of the front grip rollers 24 and 26 and that the opposed rollers 68 and 70 are freely rotating rollers which receive and guide the passbook 12 along its feed path. The upper roller 64 of the rear grip rollers is a drive roller to positively receive and convey the passbook 12. The lower roller 66 is an idler roller and is movable toward and from the upper roller 64.

A sensor (not shown) is provided in a position adjacent the rear grip rollers 64 and 66 to detect the presence of the passbook 12. A controller (not shown) is responsive to operation of the sensor to move the lower roller 66 toward the upper roller 64 and cause the rollers to grip the passbook 12. The upper roller 64 and the lower roller 66 are constructed in a manner to facilitate a page turning operation of the passbook 12.

The rear grip rollers 64 and 66 are moved in parallel with each other toward the rear of the printer. A driving wire or cable 88 is secured by means of a clip 90 to the bridge member 72 and a driving wire or cable 92 is secured by means of a clip 94 to the structure 78 for moving the bridge member 72 and the structure 78 with rollers 64 and 66 along the feed path of the passbook 12. The driving wires or cables 88 and 92 are connected to appropriate drive means (not shown) for moving the rollers 64 and 66 along the feed path for transporting the passbook toward and from the printing station. This arrangement provides that the upper roller 64 and the lower roller 66 move parallel with each other along the feed path of the passbook 12 while maintaining their relative positions. The parallel movement of the rollers 64 and 66 is realized by reason of the simultaneous movement of the driving wires 88 and 92.

The passbook 12 is moved toward the rear of the printer 10 to a position as shown in phantom lines in FIG. 1. The recorded contents of the magnetic stripe 62 on the back cover of the passbook 12 are read out by a read head 96 of a magnetic reader adjacent the printing station. It is to be noted that the read head 96 of the reader can read out the contents of the magnetic stripe 62 under conditions of traversing operation of a print head 98 of the printer 10. The traversing movement of the print head 98 along with a platen 100 is effected by means of a motor 102 driving a belt 104 trained around pulleys 103 and 105 and coupled with a lead screw 106. A right hand bracket 108 is coupled to the lead screw 106 and to a shaft 110 which carries the platen 100, and a left hand bracket 112 is coupled to the lead screw 106 and to the shaft 110. The brackets 108 and 112 engage with respective cams 114 and 116 on a cross shaft 118. A motor 120 is coupled by means of a gear 121 and a gear 122 to rotate the shaft 118. Rotation of the shaft 118 enables rotation of the brackets 108 and 112 wherein the brackets are located in a lower position while the passbook 12 is being transported along the feed path. Rotation of the shaft 118 rotates the brackets 108 and 112 to a position wherein the brackets are located in an upper position when the contents of the magnetic stripe 62 are being read and/or recorded or when printing operations are being performed.

After the contents of the magnetic stripe 62 have been read out, the passbook 12 is transported in a direction toward the front of the printer 10 by means of the driving wires 88 and 92. The passbook 12 is stopped at the printing station in a position wherein print line 124 (line 6 of the page of the passbook) is placed in alignment with or under the print head 98. FIG. 2A shows line 6 of the page as being the next print line 124 for receiving printed matter. This position of the passbook 12 is recorded in the magnetic stripe 62 and the printer controller thus has advance notice for the next operation. The printing position is also noted by the photosensor adjacent the rear grip rollers 64 and 66 when the passbook 12 is transported along the feed path.

The passbook 12 is placed in the printing position for printing of data on a predetermined number of lines and printing is accomplished by traversing movement of the print head 98 and the platen 100.

Line feeding of the passbook 12 to enable printing on additional lines by the print head 98 is accomplished by operation of the rear grip rollers 64 and 66. If additional printing of data on another line or other lines is required to complete the transaction after having printed the last line on the page, it is necessary to turn to the next page of the passbook 12.

The page turning operation is performed by controlling the movement and rotation of the rear grip rollers 64 and 66. The lower grip roller 66 is moved toward the rear of the printer 10 a predetermined distance independently of the upper grip roller 64. The predetermined distance is set so as to have the roller 66 positioned at a location for turning up or curving a portion of the passbook 12. The upper roller 64 is then rotated one revolution to spring up one page of the passbook 12 in a rearward direction and then to return the passbook to its original flat condition. The bridge member 72 is then moved rearward to align the upper roller 64 with the lower roller 66. The rollers 68 and 70 grip the pages of the passbook 12 so that only one page can be turned in this operation. In this regard, the rear grip rollers 64 and 66 can provide a page turning operation in addition to the passbook transport operation. The details of the turning operation are described in U.S. Pat. No. 4,995,184.

At the completion of the printing operation, the passbook 12 is again moved rearward and the necessary data are recorded in the magnetic stripe 62. In this manner, the printing operation and the associated reading and recording operations are accomplished. The passbook 12 is then transported from the rear grip rollers 64 and 66 to the rollers 68 and 70 and then to the front grip rollers 24 and 26, and out the port 14 at the front of the printer 10.

Figure 3:
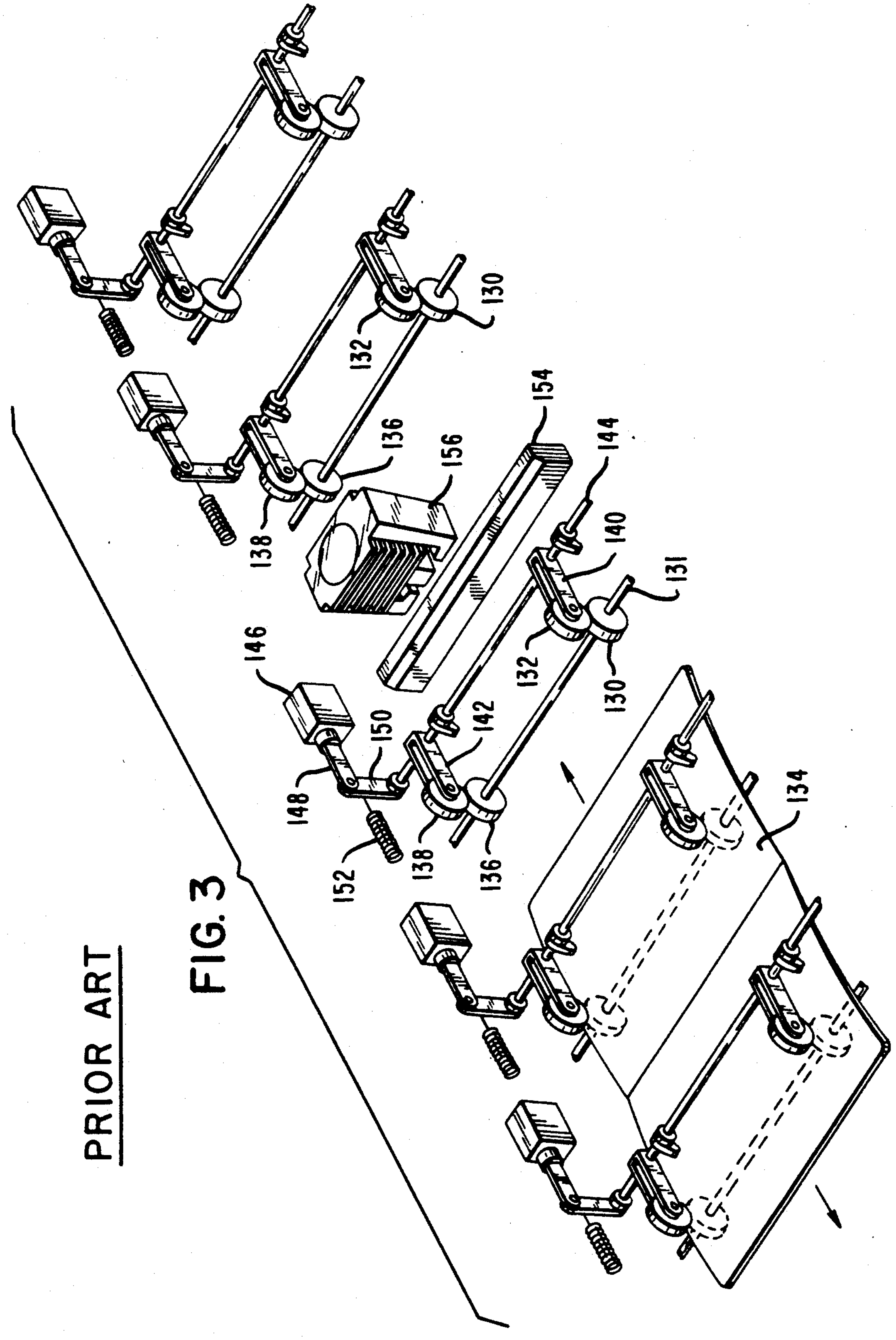
FIG. 3 PRIOR ART
FIG. 3 is a perspective view showing conveying mechanism in a conventional printer.

FIG. 3 is a perspective view showing passbook conveying mechanism in a conventional printer. One type of conveying means uses a plurality of pairs of opposed rollers 130 and 132, disposed along one side of the path of a passbook 134. A plurality of pairs of opposed rollers 136 and 138 are disposed along the other side of the path of the passbook 134. The pairs of rollers 130, 132 and 136, 138 are spaced from each other and additional pairs of such rollers are disposed at spaced intervals along the path of the passbook 134.

The rollers 130 and 136 are in fixed position on a shaft 131 and the rollers 132 and 138 are carried on arms 140 and 142, secured to a shaft 144. The rollers 132 and 138 are suitably journaled on the arms 140 and 142. A solenoid or like actuator 146 is connected to the shaft 144 by links 148 and 150 for rotating the shaft to provide space between the respective rollers for passage of the passbook 134. The solenoid 146 operates against the action of a spring 152. A platen 154 and a print head 156 are positioned at the printing station for performing printing operations on the passbook 134.

The passbook 134 or like print medium conveying means of the prior art utilizes a frictional force generated between the respective pairs of rollers 130, 132 and 136, 138. In another type of conveying means, if belts are used, the frictional force is also relied on to convey the passbook 134. The conveying of the passbook 134 depends on certain unstable factors such as uneven surfaces of the rollers, variation in material of the belt, or dust particles or moisture on the belt. Also, the passbook 134 or other print medium may jam in the printer or may be conveyed at an angle and the printing may not be done at the precise print line or may be done on a slant.

Additionally, the rollers or belts are in direct contact with the surface of the print medium on which information or data are to be printed. Since the printed medium is conveyed immediately after the printing operation, the printing ink on the surface of the printed medium may not be dry and smears or stains may result. Further, it is seen that a plurality of rollers and/or belts are necessary along the conveying path of the passbook and the increased number of components adds to the cost of manufacturing the passbook printer.

The present invention provides gripping rollers which grip the passbook and convey or transport the passbook by moving the gripping rollers along the path of the passbook. The two gripping rollers tightly grip the passbook and feed or convey the passbook in a stable condition, so that jamming, slant feeding and slant printing are eliminated. The gripping rollers are not in contact with the printed surface of the printed medium so as to avoid smearing or staining of such medium. An alternative to the gripping rollers may include two plate members constructed such that one plate member is pivotally supported and the plate members are opened and closed by actuating means so as to grip the passbook during transporting thereof along a path in the printer.

It is thus seen that herein shown and described is a passbook transport mechanism wherein two rollers grip a surface area of a passbook or like print medium on which no data or information are printed and the rollers are moved in parallel to feed the passbook along a feed path through the printer. The passbook is conveyed along such feed path in a stable condition and the printed surface area is never in contact with the gripping rollers.

The structure and arrangement enable the accomplishment of the objects and advantages mentioned above, and while the preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A print medium transport mechanism for use in a printer having a printing station, said mechanism comprising:

opposed roller means on separate parallel axes for gripping the print medium in unprinted areas thereof, and guide means positioned adjacent the printing station for moving the opposed roller gripping means and the print medium in parallel manner along a feed path toward the printing station.

2. The print medium transport mechanism of claim 1 wherein said gripping means comprise a pair of opposed rollers supported for movement along said feed path.

3. The print medium transport mechanism of claim 1 including first gripping means adjacent one side of said printing station and movable along said feed path and second gripping means adjacent the other side of said printing station and movable along said feed path.

4. The print medium transport mechanism of claim 2 wherein the gripping means includes means for moving one of said rollers toward the other of said rollers for gripping said print medium therebetween.

5. The print medium transport mechanism of claim 1 wherein said print medium comprises a passbook.

6. The print medium transport mechanism of claim 1 including guide rods disposed along said feed path and wherein the moving means comprise driving wires for moving said gripping means along said guide rods.

7. The print medium transport mechanism of claim 3 including third gripping means positioned between said printing station and said second gripping means for maintaining said print medium in position for printing.

8. In a passbook printer having a print head and a platen arranged for printing operation on said passbook, the improvement comprising:

opposed roller means on separate parallel axes for gripping the passbook in unprinted areas thereof, and guide means positioned adjacent the print head for moving the opposed roller gripping means and the passbook along a feed path in parallel manner toward the print head and the platen.

9. In the passbook printer of claim 8 wherein said gripping means comprise a pair of opposed rollers supported for linear movement along said feed path.

10. In the passbook printer of claim 8 wherein said gripping means comprises a first pair of rollers adjacent one side of said print head and a second pair of rollers adjacent the other side of said print head.

11. In the passbook printer of claim 9 wherein said gripping means includes means for moving one of said rollers toward the other of said rollers for gripping said passbook therebetween.

12. In the passbook printer of claim 9 including bearing members for supporting said opposed rollers and wherein said moving means comprise driving wires secured to said bearing members for moving said gripping means toward said print head.

13. In the passbook printer of claim 10 including a third pair of rollers positioned between said second pair of rollers and said print head for holding said passbook in position for printing operation on said passbook.

14. A method for transporting a passbook along a feed path toward a printing station in a printer having opposed rollers comprising the steps of:

inserting the passbook in open position into the printer at one end thereof, gripping the passbook by said opposed rollers in unprinted areas at each end of the passbook, and providing guide means adjacent the printing station for moving the passbook while gripping thereof by said opposed rollers along said feed path n parallel manner toward the printing station for printing operation on the passbook.

15. The method of claim 14 including the further steps of moving the passbook to a recording station for reading a bar code of the passbook in the open position thereof and then moving the passbook into position at the printing station for printing operation.

16. The method of claim 14 including the further step of moving the passbook to a recording station for recording information on the passbook after the printing operation.

* * * * *

UNITED STATES PATENT AND TRADEMARK OFFICE

CERTIFICATE OF CORRECTION

PATENT NO. : 5,142,129

DATED : August 25, 1992

INVENTOR(S) : Yasushi Nakamura et al.

It is certified that error appears in the above-identified patent and that said Letters Patent is hereby corrected as shown below:

Column 8, line 40, delete "n" and substitute --in--.

Signed and Sealed this

Seventh Day of December, 1993

*Attest:*

BRUCE LEHMAN

*Attesting Officer*

*Commissioner of Patents and Trademarks*